US012809096B2

(12) United States Patent
Chang

(10) Patent No.: US 12,809,096 B2
(45) Date of Patent: Nov. 24, 2026

(54) FIBER OPTIC ADAPTER HAVING TOP AND BOTTOM INTEGRAL LATCHING ARMS AND THE METHOD MAKING THE SAME

(71) Applicant: Senko Advanced Components Inc., Hudson, MA (US)

(72) Inventor: Jimmy Chang, Sturbridge, MA (US)

(73) Assignee: Senko Advanced Components, Inc., Hudson, MA (US)

( * ) Notice: Subject to any disclaimer, the term of this patent is extended or adjusted under 35 U.S.C. 154(b) by 264 days.

(21) Appl. No.: 18/807,302

(22) Filed: Aug. 16, 2024

(65) Prior Publication Data

US 2025/0060539 A1 Feb. 20, 2025

Related U.S. Application Data

(60) Provisional application No. 63/520,564, filed on Aug. 18, 2023.

(51) Int. Cl.
*G02B 6/38* (2006.01)

(52) U.S. Cl.
CPC ......... *G02B 6/3825* (2013.01); *G02B 6/3885* (2013.01)

(58) Field of Classification Search
None
See application file for complete search history.

(56) References Cited

U.S. PATENT DOCUMENTS

| | | | | | |
|---|---|---|---|---|---|
| 5,774,612 | A * | 6/1998 | Belenkiy | G02B 6/3825 | 385/60 |
| 8,827,571 | B2 * | 9/2014 | Allen | G02B 6/3807 | 385/136 |
| 9,075,203 | B2 * | 7/2015 | Holmberg | G02B 6/3825 | |
| 9,429,714 | B2 * | 8/2016 | Holmberg | G02B 6/3825 | |
| 9,678,282 | B2 * | 6/2017 | Allen | G02B 6/3807 | |
| 9,784,923 | B2 * | 10/2017 | Holmberg | G02B 6/3825 | |
| 10,247,887 | B2 * | 4/2019 | Holmberg | G02B 6/3825 | |
| 10,481,341 | B2 * | 11/2019 | Coenegracht | G02B 6/3825 | |
| 10,884,194 | B2 * | 1/2021 | Holmberg | G02B 6/3825 | |
| 11,262,508 | B2 * | 3/2022 | Holmberg | G02B 6/3825 | |
| 11,474,302 | B2 * | 10/2022 | Coenegracht | G02B 6/3825 | |
| 11,567,268 | B2 * | 1/2023 | Coenegracht | G02B 6/3825 | |
| 11,579,379 | B2 * | 2/2023 | Chang | G02B 6/3821 | |
| 11,604,317 | B2 * | 3/2023 | Holmberg | G02B 6/3825 | |
| 11,624,875 | B2 * | 4/2023 | Ho | G02B 6/3825 | 385/139 |
| 11,982,842 | B2 * | 5/2024 | Coenegracht | G02B 6/3825 | |
| 11,988,877 | B2 * | 5/2024 | Holmberg | G02B 6/3825 | |
| 12,449,612 | B2 * | 10/2025 | Chang | G02B 6/3821 | |

(Continued)

*Primary Examiner* — Andrew Jordan

(57) ABSTRACT

The present disclosure relates to a fiber optic adapter mating multiple fiber optic connectors to establish optical transmission. The fiber optic adapter includes an adapter housing defining an outer appearance of the fiber optic adapter and having a top wall, bottom wall and side walls therebetween, having a first end and an opposite second end along a length direction, a space formed within the adapter housing between the first end and the second end; and multiple partition walls extending between the first end and the second end to divide the space into multiple channels. Each channel is provided with a first elongated arms adjacent to the first end and extending toward the second end, and the first elongated arm is configured to be formed integrally with the top or bottom wall of the adapter housing.

12 Claims, 14 Drawing Sheets

(56) References Cited

U.S. PATENT DOCUMENTS

| | | | | |
|---|---|---|---|---|
| 12,461,317 | B2 * | 11/2025 | Holmberg | G02B 6/3825 |
| 12,571,968 | B2 * | 3/2026 | Coenegracht | G02B 6/3825 |
| 2012/0251067 | A1 * | 10/2012 | Allen | G02B 6/3807 385/136 |
| 2012/0301080 | A1 * | 11/2012 | Gniadek | G02B 6/3825 385/56 |
| 2013/0183018 | A1 * | 7/2013 | Holmberg | G02B 6/3825 385/135 |
| 2014/0369649 | A1 * | 12/2014 | Allen | G02B 6/3807 385/75 |
| 2015/0277060 | A1 * | 10/2015 | Holmberg | G02B 6/3825 385/56 |
| 2017/0131482 | A1 * | 5/2017 | Holmberg | G02B 6/3825 |
| 2017/0235060 | A1 * | 8/2017 | Coenegracht | G02B 6/3825 385/60 |
| 2018/0275352 | A1 * | 9/2018 | Holmberg | G02B 6/3825 |
| 2019/0018201 | A1 | 1/2019 | Takano et al. | |
| 2020/0041730 | A1 * | 2/2020 | Coenegracht | G02B 6/3825 |
| 2020/0096706 | A1 * | 3/2020 | Holmberg | G02B 6/3825 |
| 2020/0310048 | A1 * | 10/2020 | Chang | G02B 6/3821 |
| 2021/0208340 | A1 * | 7/2021 | Holmberg | G02B 6/3825 |
| 2021/0247572 | A1 * | 8/2021 | Ho | G02B 6/3825 |
| 2022/0155531 | A1 * | 5/2022 | Holmberg | G02B 6/3825 385/59 |
| 2022/0334321 | A1 * | 10/2022 | Coenegracht | G02B 6/3825 |
| 2023/0152535 | A1 * | 5/2023 | Chang | G02B 6/3821 385/78 |
| 2023/0221495 | A1 * | 7/2023 | Coenegracht | G02B 6/3825 385/60 |
| 2023/0314723 | A1 * | 10/2023 | Holmberg | G02B 6/3825 385/59 |
| 2024/0345330 | A1 * | 10/2024 | Coenegracht | G02B 6/3825 |
| 2024/0402437 | A1 * | 12/2024 | Holmberg | G02B 6/3825 |
| 2025/0060539 | A1 * | 2/2025 | Chang | G02B 6/3825 |
| 2026/0036758 | A1 * | 2/2026 | Holmberg | G02B 6/3825 |
| 2026/0169230 | A1 * | 6/2026 | Coenegracht | G02B 6/3825 |

* cited by examiner

FIBER OPTIC ADAPTER HAVING TOP AND BOTTOM INTEGRAL LATCHING ARMS AND THE METHOD MAKING THE SAME

CROSS-REFERENCE TO RELATED APPLICATION

The present invention claims priority to U.S. Provisional Patent Application No. 63/520,564 filed on Aug. 18, 2023, the disclosure of which is incorporated hereby by reference in its entirety.

FIELD OF THE INVENTION

The present invention relates generally to a fiber optic adapter with a simplified integral structure and a method of making the same.

BACKGROUND

The prevalence of the Internet has led to unprecedented growth in communication networks. The use of fiber optic devices for communications purposes continues to grow. Data, voice, and other communication networks increasingly use fiber optic devices to transfer signals and data. Fiber optic adapters are widely used to mate two fiber optic connectors to connect two optical cables, establishing the optical transmission. The fiber optic adapter may mate the two fiber optic connectors of the same kind or different kinds.

US20190018201A1, assigned to the applicant, published on Jan. 17, 2019, discloses a fiber optic adapter receiving the same kind of connectors on both ends. The adapter has an adapter alignment assembly including receptacle hooks to grip the connectors on both ends. The adapter alignment assembly is assembled to the adapter through the adapter housing hooks. The industry prefers a more simplified structure to reduce the cost.

When the adapter has one channel, it is possible to incorporate the adapter alignment assembly into the adapter by molding procedure as the channel is accessible from all six directions, i.e., top, bottom, left, right and side directions. However, when the adapter has more than one channels, for example, three channels, the middle channel is not accessible from either of the adjacent channels, i.e., side directions. It is desired to design an integral adapter having at least three channels with a reduced cost.

SUMMARY

The present invention relates to an adapter with a simplified integral structure and the method of making the same. In one aspect of the present invention, the fiber optic adapter includes an adapter housing defining an outer appearance of the fiber optic adapter and having a top wall, bottom wall and side walls therebetween, having a first end and an opposite second end along a length direction, a space formed within the adapter housing between the first end and the second end; and multiple partition walls extending between the first end and the second end to divide the space into multiple channels. Each channel is provided with a first elongated arms adjacent to the first end and extending toward the second end, and the first elongated arm is configured to be formed integrally with the top or bottom wall of the adapter housing.

In some embodiments, the fiber optic adapter further comprises a second elongated arm adjacent to the second end and extending toward the first end, wherein the second elongated arm is configured to be formed integrally with the top or bottom wall of the adapter housing.

In another respect of the present invention, the method of making the fiber optic adapter includes forming the adapter housing and the elongated arms by injection molding; and attaching two cover plates to the top wall and bottom wall of the adapter housing.

BRIEF DESCRIPTION OF THE DRAWINGS

The present invention will become more fully understood from the detailed description given hereinbelow and the accompanying drawings, which are given by illustration only, and thus are not limitative of the present invention, and wherein.

DETAILED DESCRIPTION OF THE INVENTION

Figure 1A:
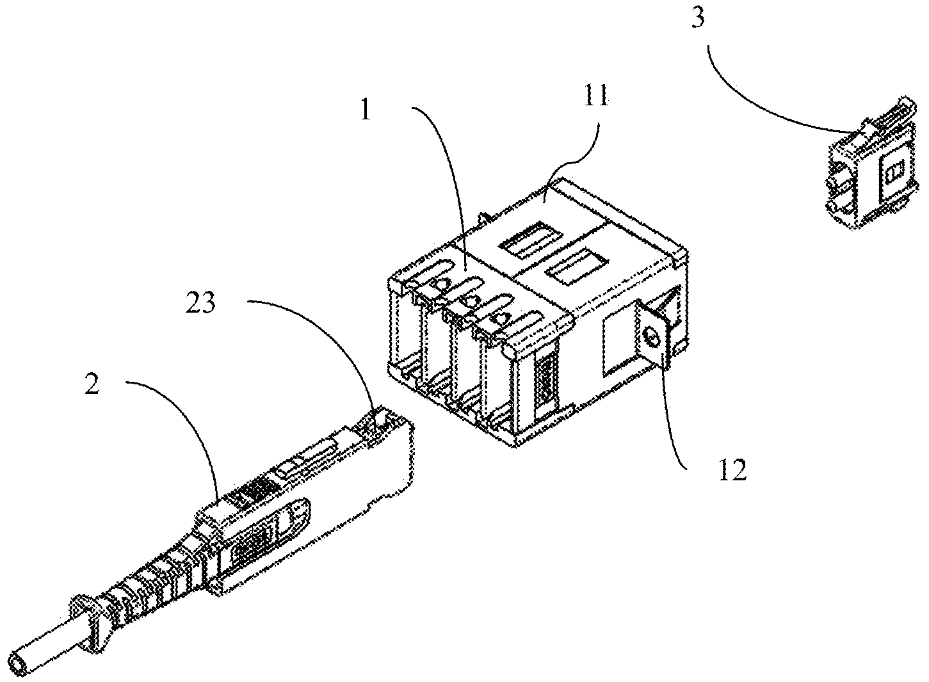
Prior Art FIG.1A
FIG. 1A is a perspective view of a conventional adapter receiving two fiber optic connectors at both ends.

This disclosure is not limited to any particular system, device and method described, as these may vary. The terminology used in the description is for the purpose of describing the examples or embodiments only and is by no means intended to limit the scope.

Reference will now be made in detail to the present embodiment(s) of the invention, examples of which are illustrated in the accompanying drawings. Whenever possible, the same reference numerals will be used throughout the drawings to refer to the same or like parts.

The conventional fiber optic adapter 1 receiving two different kinds of connectors is shown in FIG. 1A. A first fiber optic connector 2 is inserted at one end and a second fiber optic connector 3 is inserted at the other end. The first and second fiber optic connectors may be selected from the SNR series connectors made and sold by the applicant, for example, the first fiber optic connector is an SN standard connector, and the second fiber optic connector is an SN BTW connector, etc. The fiber optic adapter 1 is attached to its position through mounting plates 12.

Figure 1B:
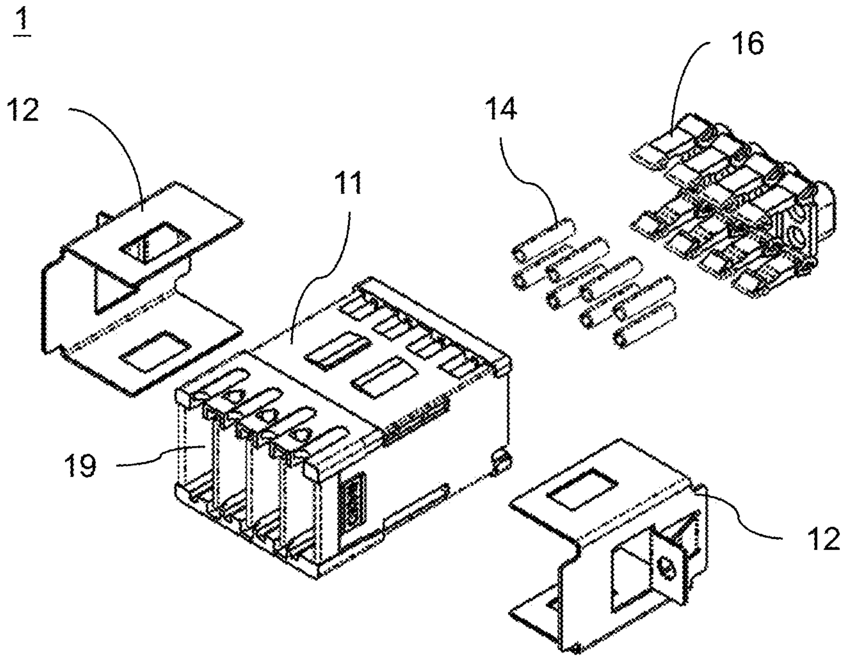
Prior Art FIG.1B
FIG. 1B is an exploded perspective view of the fiber optic adapter of FIG. 1A.

FIG. 1B illustrates an exploded perspective view of the fiber optic adapter 1. The fiber optic adapter 1 includes an adapter housing 11, mounting plates 12, multiple sleeves 14, and multiple alignment assemblies 16. The adapter housing 11 as shown has four channels 19 each of which is installed with an alignment assembly 16.

Figure 1C:
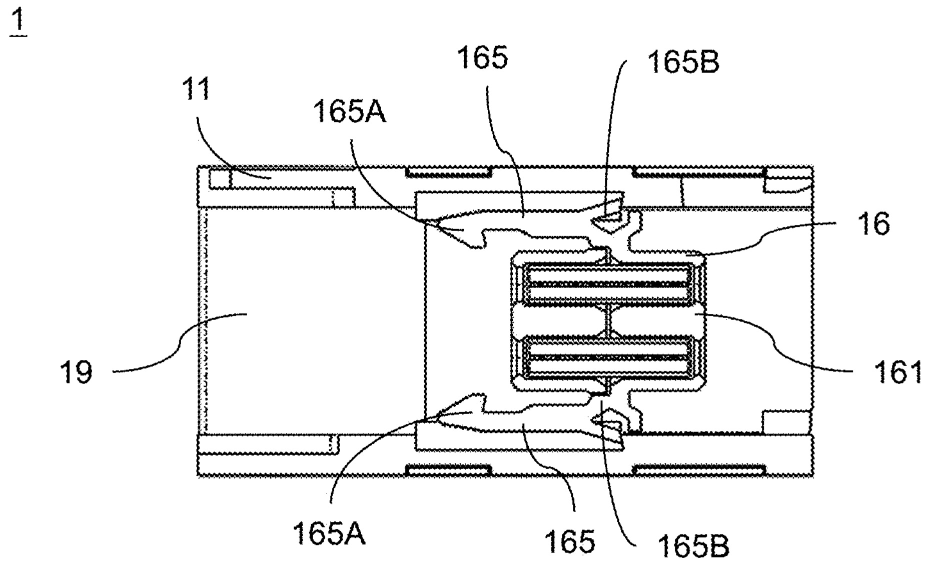
Prior Art FIG.1C
FIG. 1C is a sectional view of the fiber optic adapter of FIG. 1A.

FIG. 1C illustrates a sectional view of the fiber optic adapter 1. The alignment assembly 16 is installed into each channel 19 of the adapter housing 11. The alignment assembly 16 includes a sleeve holder portion 161 at the center and an elongated arm 165 arranged at each side, i.e., the upper and lower sides of the sleeve holder portion 161. Each elongated arm 165 extends a certain distance away from the sleeve holder portion 161 and is provided with a first hook 165A at a distal end to be received by a recess 23 of the fiber optic connector 2 (see FIG. 1A). A second hook 165B is provided on the elongated arm 165 opposite the first hook 165A. The first hooks 165A are used to secure the fiber optic connector 2 within the adapter housing 11, and the second hooks 165B are used to attach the alignment assembly 16 onto the adapter housing 11, preventing the movement of the alignment assembly 16 when the fiber optic connectors 2 are inserted or withdraw from the fiber optic adapter 1.

Figure 1D:
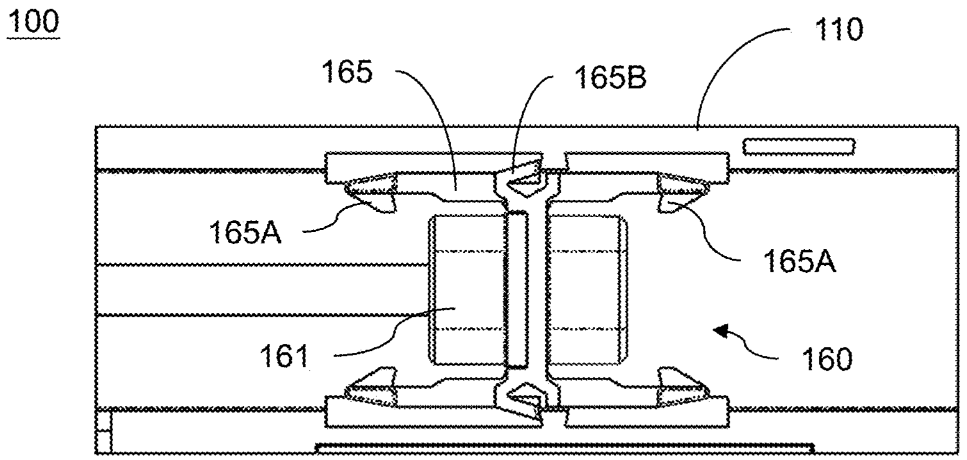
Prior Art FIG.1D
FIG. 1D is a sectional view of another conventional fiber optic adapter.

FIG. 1D illustrates a sectional view of the fiber optic adapter receiving the same type of the fiber optic connectors at both ends. The fiber optic adapter 100 includes an adapter housing 110 and multiple alignment assemblies 160. Each alignment assembly 160 has a sleeve holder portion 161 configured to align the fiber optic connectors inserted. Two oppositely arranged elongated arms 165 are provided at the upper portion of the alignment assembly 160 and extend along opposite directions. The second hook 165B is provided between the two oppositely arranged elongated arms 165 and is configured to attach the alignment assembly 160 to the adapter housing 110. Two oppositely arranged elongated arms 165 are also provided on the lower portion of the alignment assembly 160.

Figure 1E:
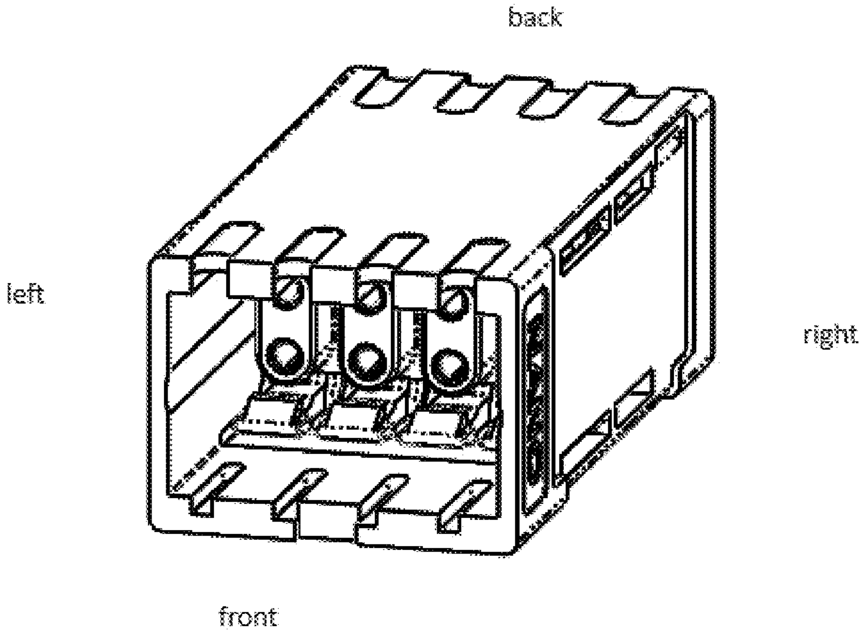
Prior Art FIG.1E
FIG. 1E is a perspective view of the fiber optic adapter of FIG. 1D.

As shown in FIG. 1E, according to the traditional molding method, the tooling can access the fiber optic adapter from four directions, i.e., front, back, left, and right directions. Therefore, it is challenging to mold the alignment assembly or the elongated arm to the multi-channel adapter housing as one piece, especially in the middle two channels of the adapter housing when the adapter housing has four channels.

Figure 2A:
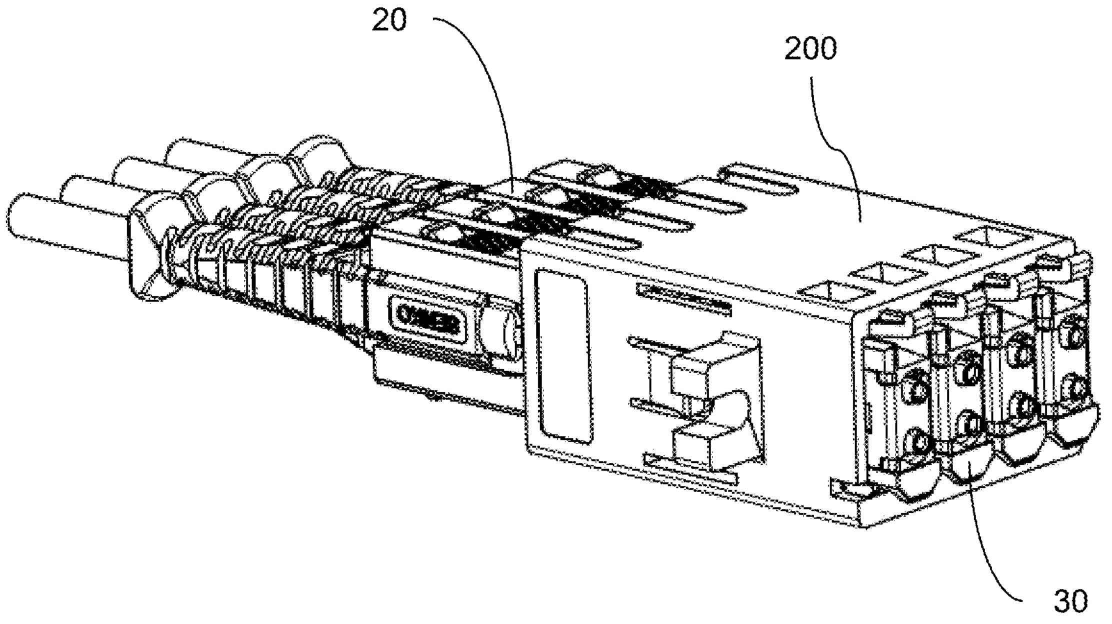
FIGS. 2A and 2B illustrates one example implementation of an adapter in accordance with the present invention, receiving two fiber optic connectors at both ends.
Figure 2B:
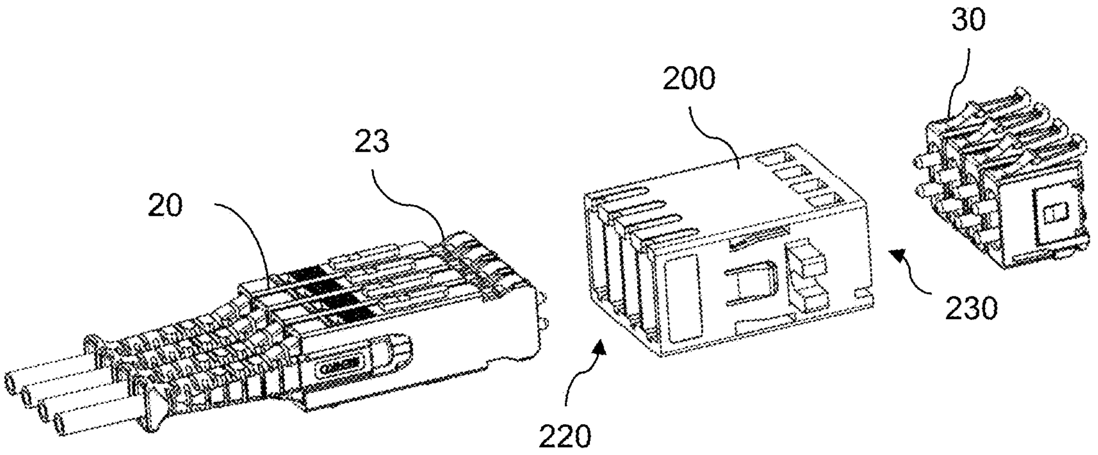

FIG. 2A is a perspective view of a fiber optic adapter 200 in accordance with one example implementation of the present invention. The fiber optic adapter 200 receives a first fiber optic connector 20 at a first end and a second fiber optic connector 30 at a second end. The fiber optic connectors 20 and 30 are similar to the connectors shown in FIG. 1A. As shown in FIG. 2B, the fiber optic adapter 200 receives the first fiber optic connector 20 at a first end 220 and the second fiber optic connector 30 at a second end 230.

Figure 3A:
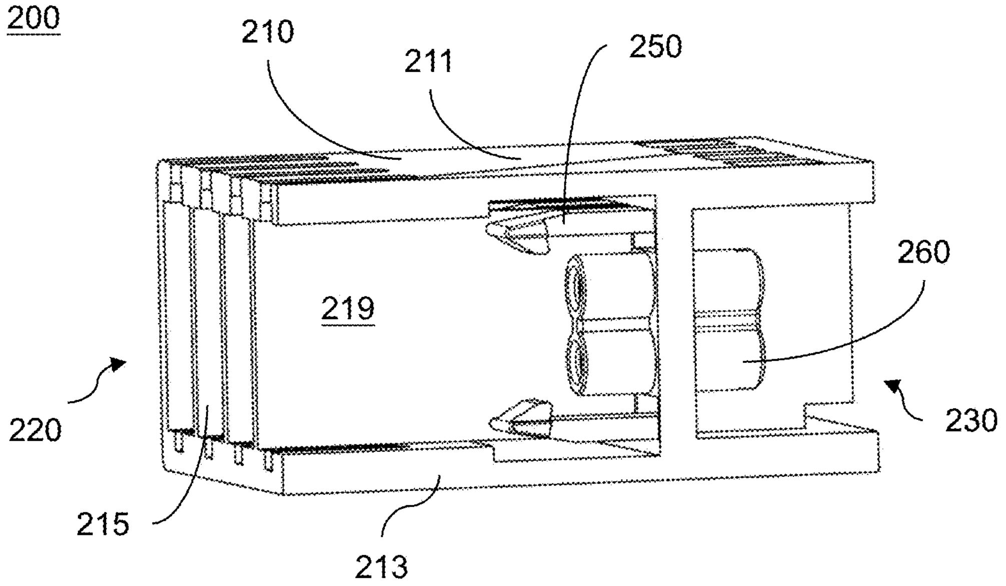
FIGS. 3A and 3B are sectional views of the fiber optic adapter of FIGS. 2A-2B.
Figure 3B:
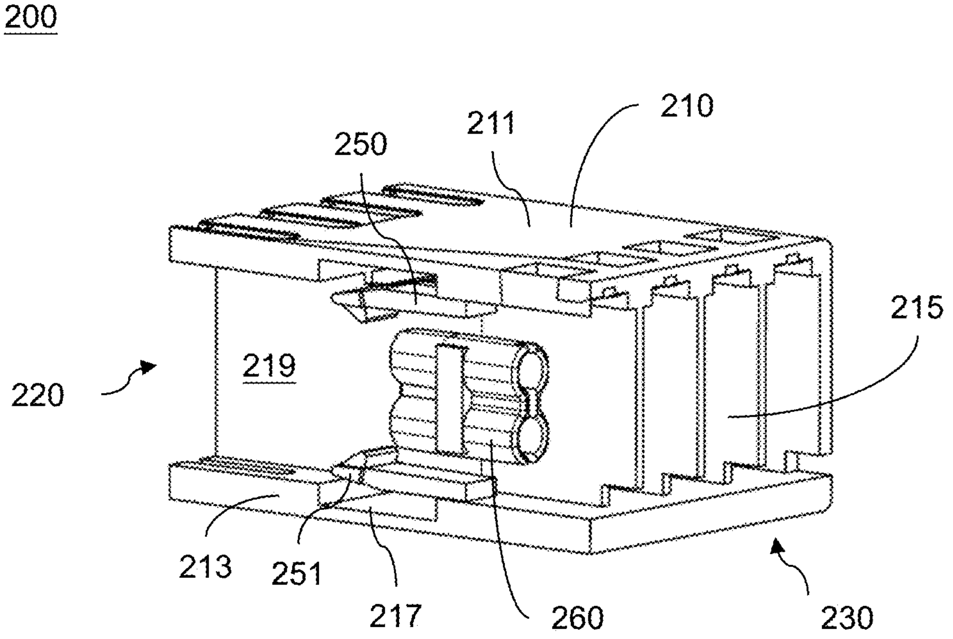

FIGS. 3A and 3B are sectional views of the fiber optic adapter of FIGS. 2A-2B. The fiber optic adapter 200 includes an adapter housing 210, alignment portions 260, and elongated arms 250, which are injection-molded as a unitary piece. The adapter housing 210 includes a top wall 211, bottom wall 213 and partition walls 215 extending in a length direction to divide a space defined by the adapter housing 210 into several channels 219. The cover plates (not shown) are attached to the top and bottom walls of the adapter housing 210 after the adapter housing 210 has been molded. The adapter housing may be formed of a polymer material by an injection molding process. Each channel 19 is provided with the alignment portion 260 and elongated arms 250. FIG. 3B shows four channels, however, those skilled in the art would understand the adapter housing may have more or less than four channels.

Each elongated arm 250 is arranged adjacent to the second end 230 extending towards the first end 220 and formed integrally with the top wall 211 or bottom wall 213 in each channel 219 to form a one-piece unit. The elongated arm 250 has a connector hook 251 at its distal end and has elastic strength such that it returns to its original position when the connector hook 251 moves towards the top wall 211 or bottom wall 213. A recess 217 is provided on the top wall 211 or bottom wall 213 to allow the connector hook 251 to move towards the top wall 211 or bottom wall 213. The connector hook 251 is configured to secure the fiber optic connector within the adapter 200.

The alignment portion 260 is arranged between the top and bottom walls in each channel 219 and is configured to hold and align the ferrules of the fiber optic connectors 20, 30 and the respective sleeves (now shown). As shown in FIG. 3B, the alignment portion 260 is integrated into the adapter housing 210, for example to the partition wall(s) 215. The elongated arms 250 are positioned above and beneath the alignment portion 260, respectively.

Figure 4:
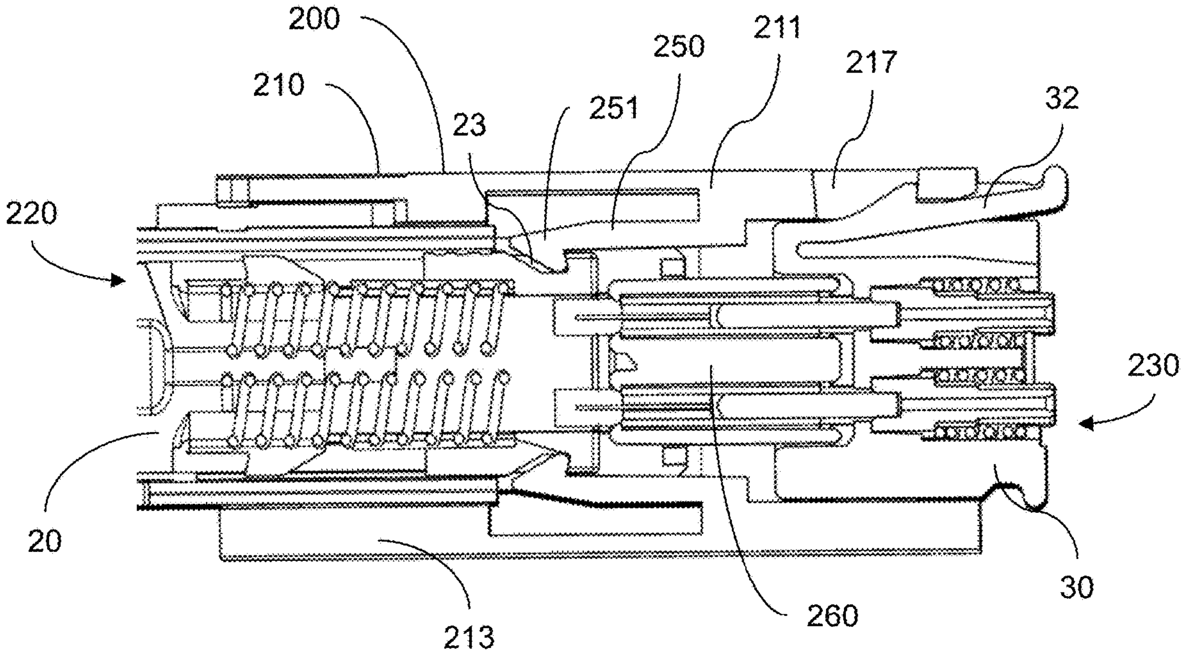
FIG. 4 is a sectional view of the fiber optic adapter receiving two fiber optic connectors.

FIG. 4 is a sectional view of the fiber optic adapter 200 receiving two fiber optic connectors. The first fiber optic connector 20 is inserted into the first end 220 of the adapter housing 210, and the second fiber optic connector 30 is inserted into the second end 230 of the adapter housing 210. The connector hooks 251 are provided on both top wall 211 and bottom wall 213, and received in the recesses 23 of the first fiber optic connector 20 to prevent the inadvertent withdrawal of the first connector 20 from the adapter 200. The adapter housing 210 includes opening 217 on the top wall 211 to catch at least a portion of the latch 32 of the second fiber optic connector 30 to prevent the inadvertent withdrawal of the second fiber optic connector 30 from the adapter 200. The alignment portion 260 aligns the LC ferrules of the first fiber optic connector 20 and second fiber optic connector 30 to establish stable optical communication therebetween.

Figure 5:
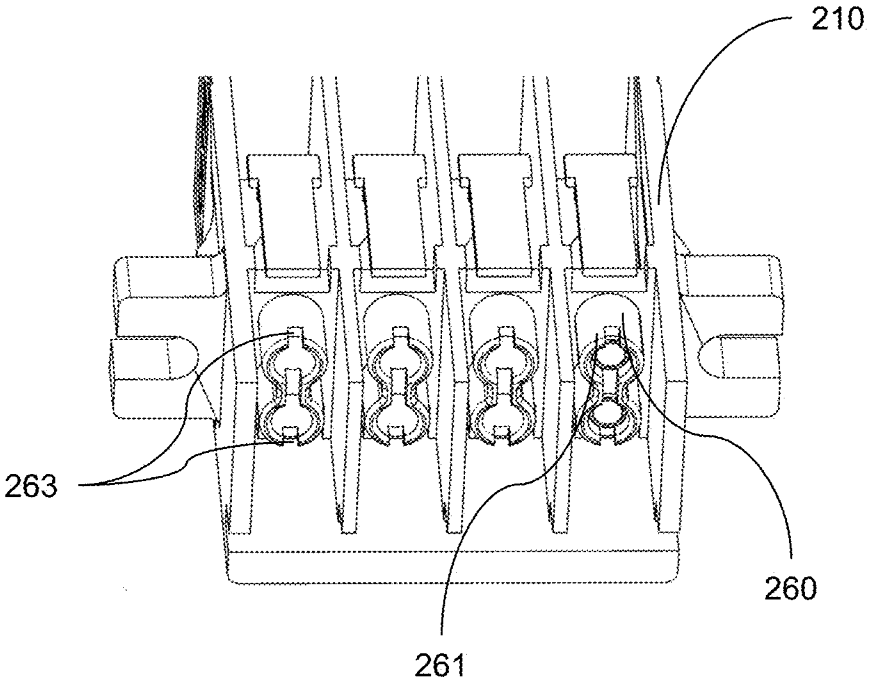
FIG. 5 illustrates the internal structure of the adapter housing when the top wall of the adapter housing is removed, FIG. 6 illustrate a fiber optic adapter of another example implementation of the fiber optic adapter in accordance with the present invention receiving a third fiber optic connector and a fourth fiber optic connector at both ends.
Figure 12A:
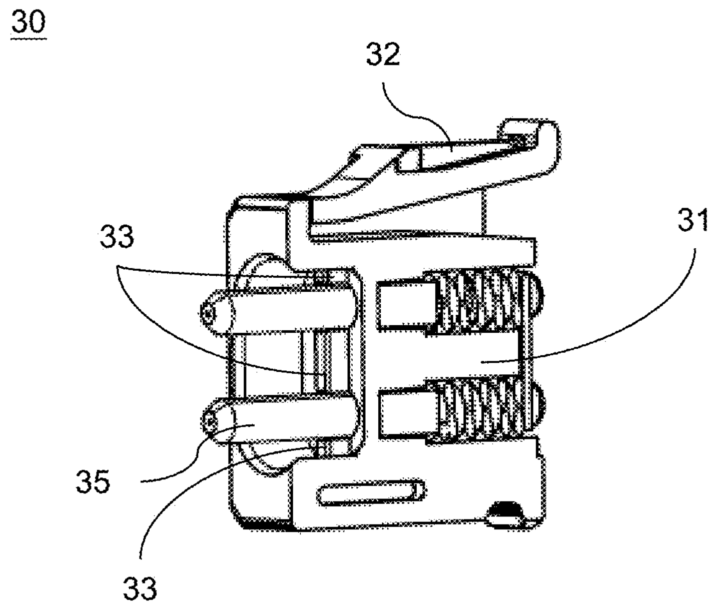
Figure 12B:
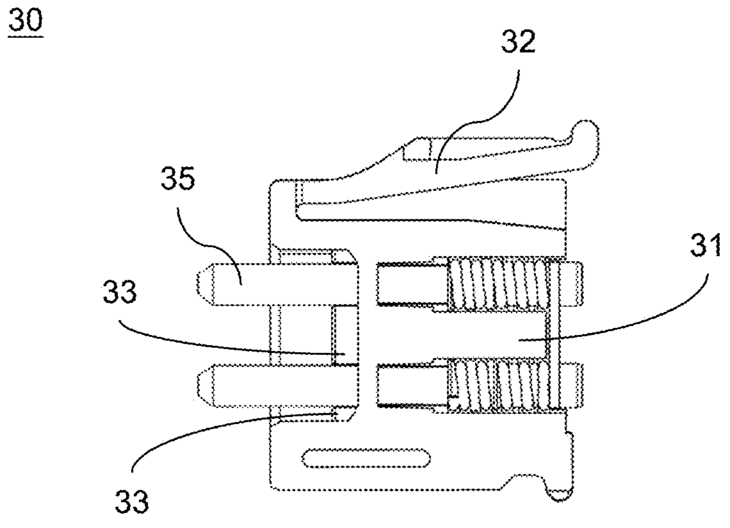

FIG. 5 illustrates the internal structure of the adapter housing 210. The alignment portion 260 includes a main body 261 which is in a binocular shape extending in the length direction and is provided with multiple cutouts 263 adjacent to the side receiving the second fiber optic connector 30. The second fiber optic connector 30 shown in FIGS. 12A and 12B includes a housing 31 holding two LC ferrules 35 arranged in a height direction. A rib 33 is provided on the side of the housing from which the ferrules 35 protrude and extends in the height direction. The cutout 263 is configured to receive the rib 33 of the fiber optic connector 30 to secure the second fiber optic connector 30 and protect the housing 31 of the second fiber optic connector 30 from the sleeve holder/alignment portion.

Figure 6:
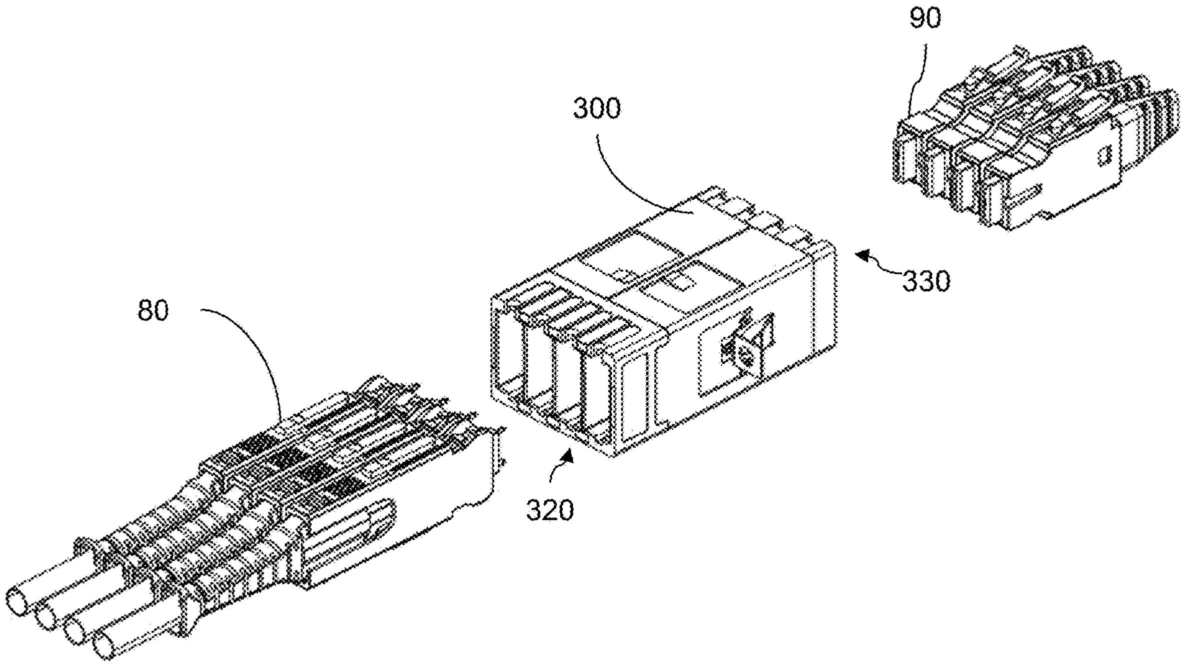

Now referring to FIG. 6, the fiber optic adapter 300 of a second example implementation of the present disclosure receives a third fiber optic connector 80 and a fourth fiber optic connector 90. Unlike the first and second fiber optic connectors including LC ferrules, the third and fourth fiber optic connectors 80, 90 may include mechanical transfer ferrule with a plural of optical fibers therein such as twelve (12) or twenty-four (24) fibers. The fiber optic adapter 300 receives the third fiber optic connector 80 at the first end 320 and the fourth fiber optic connector 90 at the second end 330.

Figure 7A:
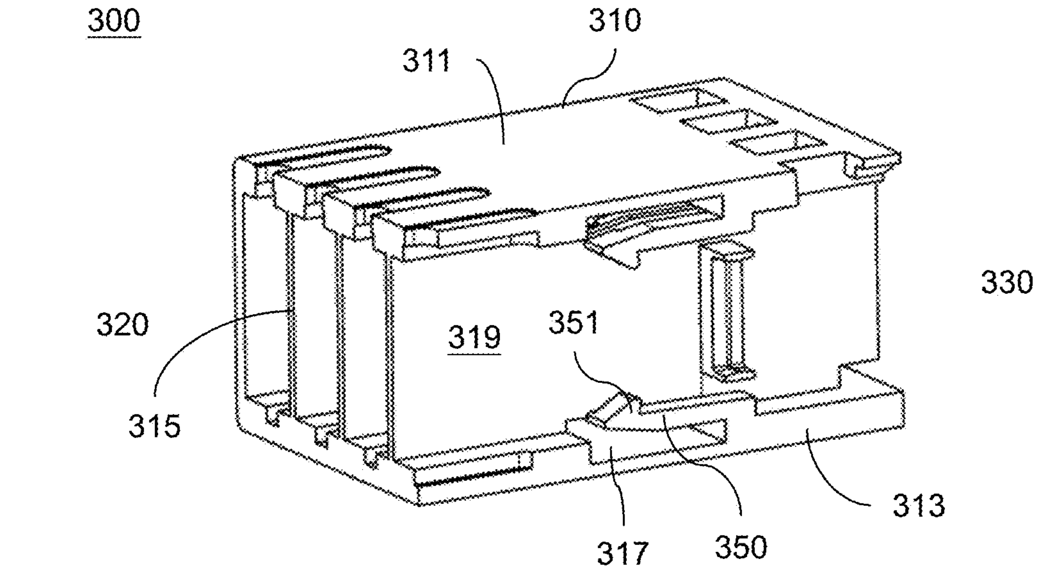
FIGS. 7A-7B are sectional view of the adapter housing shown in FIG. 6.

As shown in FIG. 7A, the fiber optic adapter 300 includes an adapter housing 310 and elongated arms 350. The adapter housing 310 includes a top wall 311, bottom wall 313 and multiple partition walls 315 extending in the length direction to divide the space defined by the adapter housing 310 into several channels 319. The adapter housing 320 and elongated arms 350 are injection-molded as a unitary piece, for example made of a polymer material by an injection molding process.

The elongated arm 350 is provided adjacent to the second end 330 of the adapter 300 and extends toward the first end 320 of the adapter 300. The elongated arm 350 has a connector hook 351 at its distal end configured to secure the fiber optic connector 800 inserted from the first end 320 with the adapter 300. The elongated arm 350 is formed integrally with the top wall 311 or bottom wall 313 of the adapter housing 310 in each channel 319 and is made of a flexible material. Accordingly, a recess 317 is formed on the top wall 311 or bottom 313 to provide the space for the movement of the elongated arm 350. Arranging the number of the elongated arm in each channel simplifies the manufacture of the adapter housing.

Figure 7B:
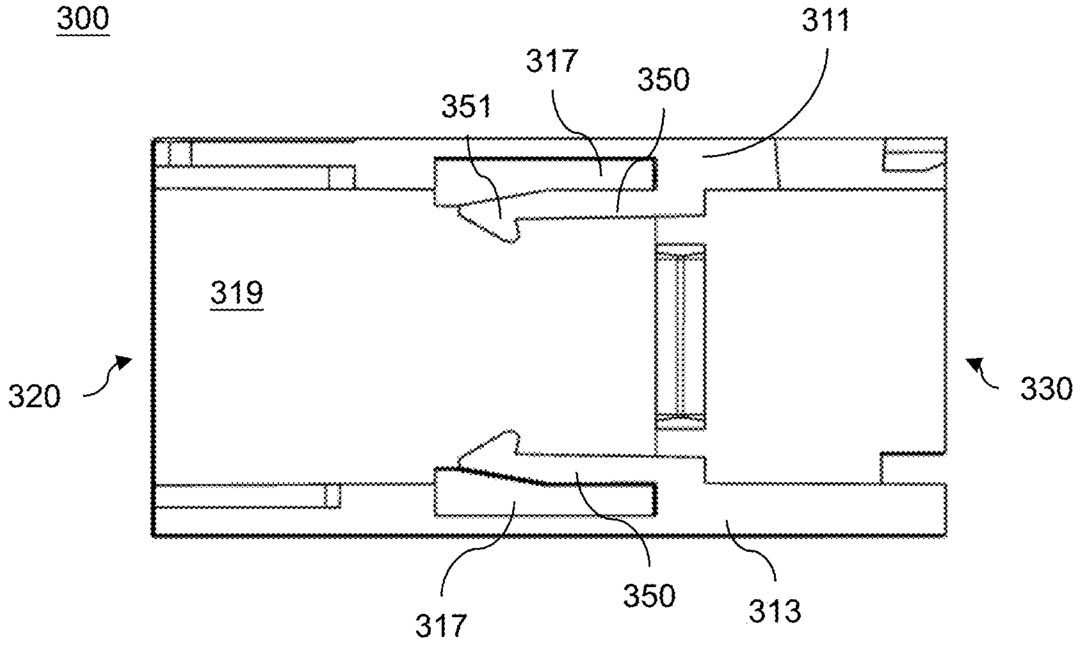

As shown in FIG. 7B, the fiber optic adapter 300 is absent from the alignment portion positioned between the top wall 311 and the bottom wall 313. Those skilled in the art would understand the third and fourth fiber optic connectors are aligned with the means of pin guide and pin holes. When the third fiber optic connector 80 is inserted into channel 319, the elongated arms 350 on the top wall 311 and bottom wall 313 are pushed away by the third fiber optic connector 80 and enter the recesses 317 respectively and return to the original positions when the third fiber optic connector 80 reaches its destination.

Figure 8:
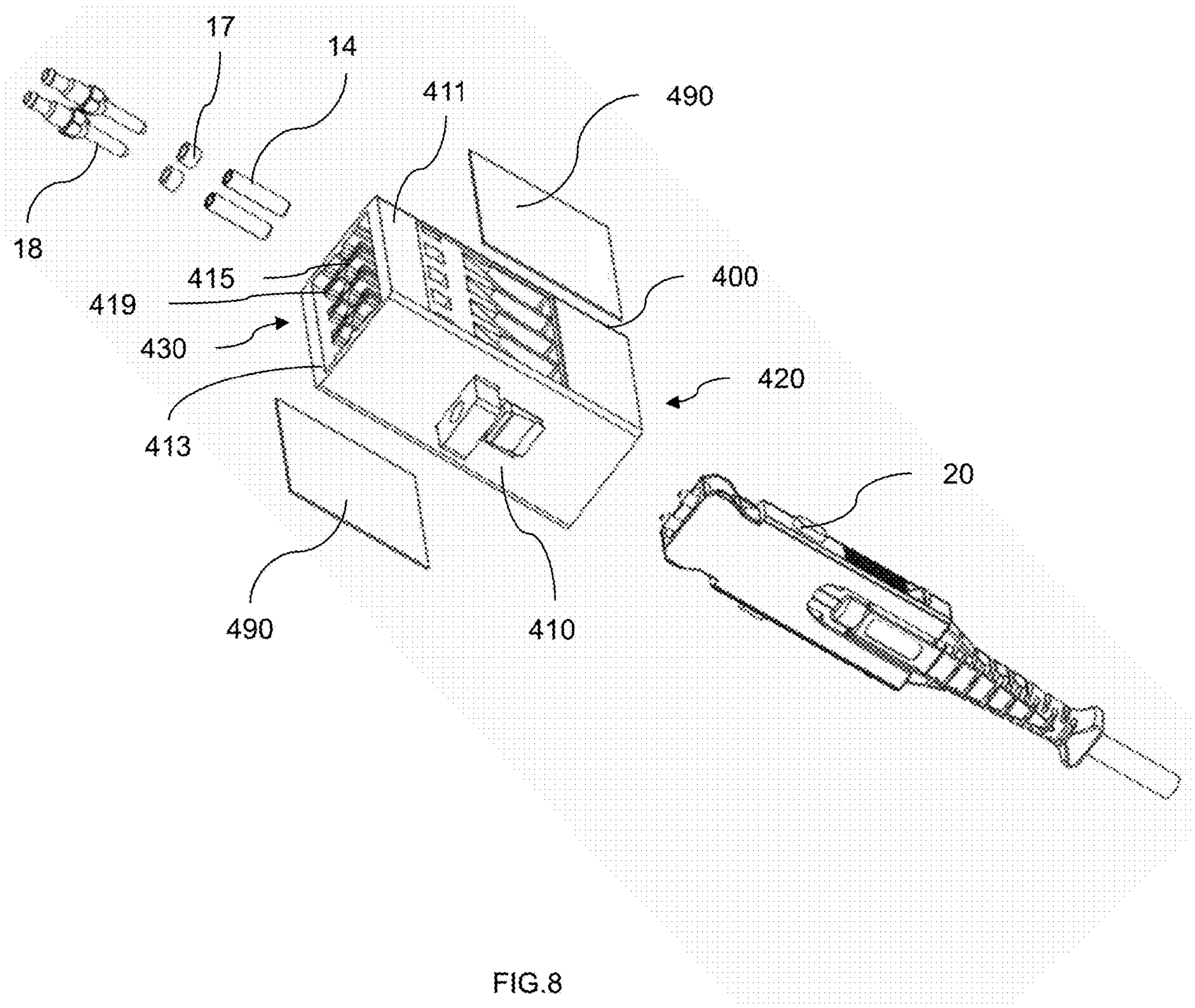
FIG. 8 is a perspective view of a fiber optic adapter of the other example implementation of the fiber optic adapter in accordance with the present disclosure receiving a first fiber optic connector at one end and ferrules at the other end.

Now turning to FIG. 8, the fiber optic adapter 400 in accordance with a third example receives the fiber optic connector 20 at the first end 420 and receives two LC ferrules 18 at the second end 430. The adapter 400 includes cover plates 490 and an adapter housing 410 having a top wall 411, bottom wall 413 and a plurality of channels 419 divided by a plurality of partition walls 415 extending in the length direction.

Figure 9A:
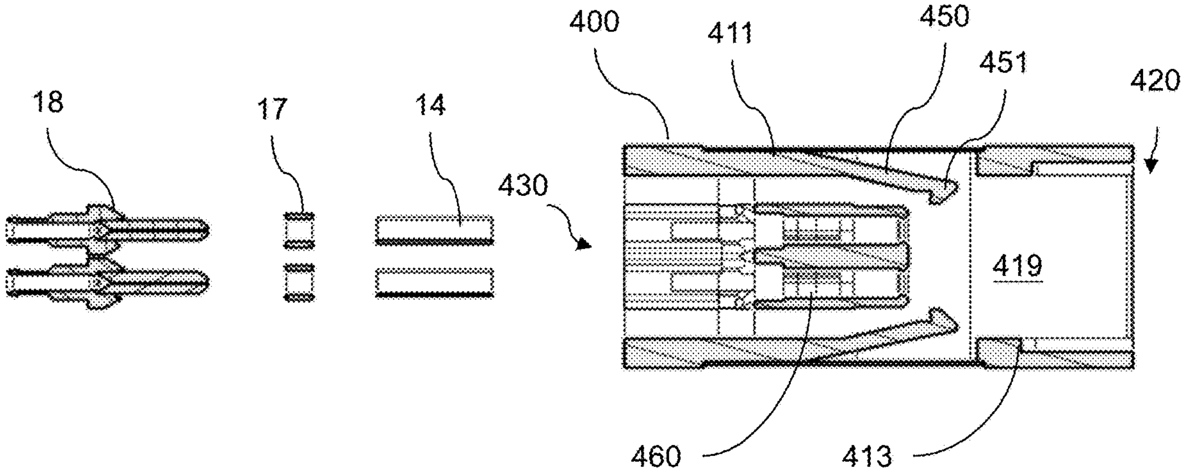
FIGS. 9A-9B illustrate the insertion of the ferrules into the fiber optic adapter of FIG. 8.
Figure 9B:
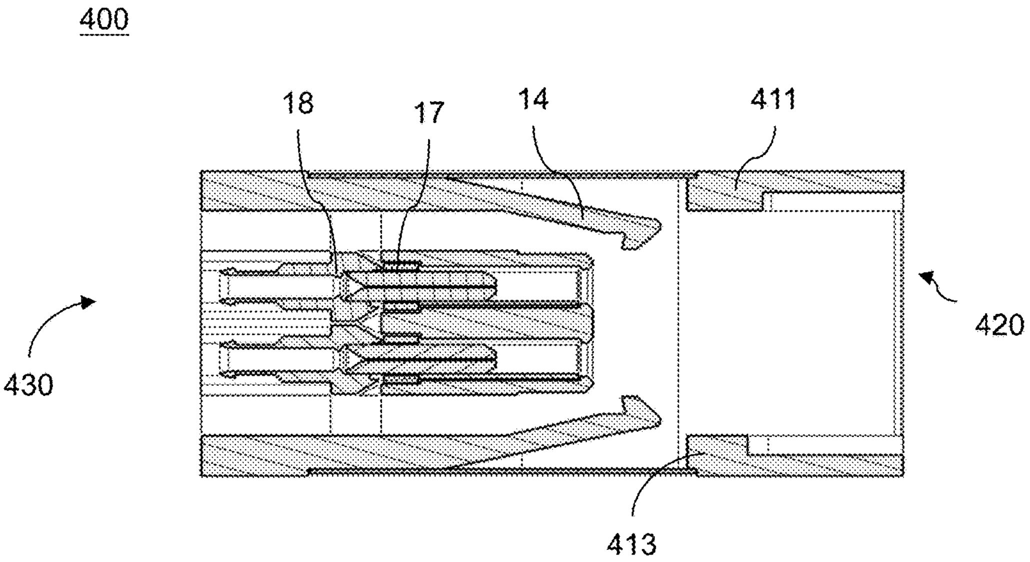

As shown in FIGS. 9A-9B, a pair of elongated arms 450 are provided adjacent to the second end 430 of the fiber optic adapter 400 in each channel 419 and extend toward the first end 420 of the fiber optic adapter 400. The elongated arms 450 are formed integrally with the top wall 411 and bottom wall 413 and each elongated arm 450 has a connector hook 451 at its distal end. The fiber optic adapter 400 includes an alignment portion 460 between the elongated arms 450 in each channel 419 to align the ferrules 18 with the first fiber optic connector 20. To secure the ferrule 18 in the alignment portion 420, a spacer 17 is positioned between the ferrule 18 and alignment portion 460 and is configured to press against the sleeve 14.

Figure 10:
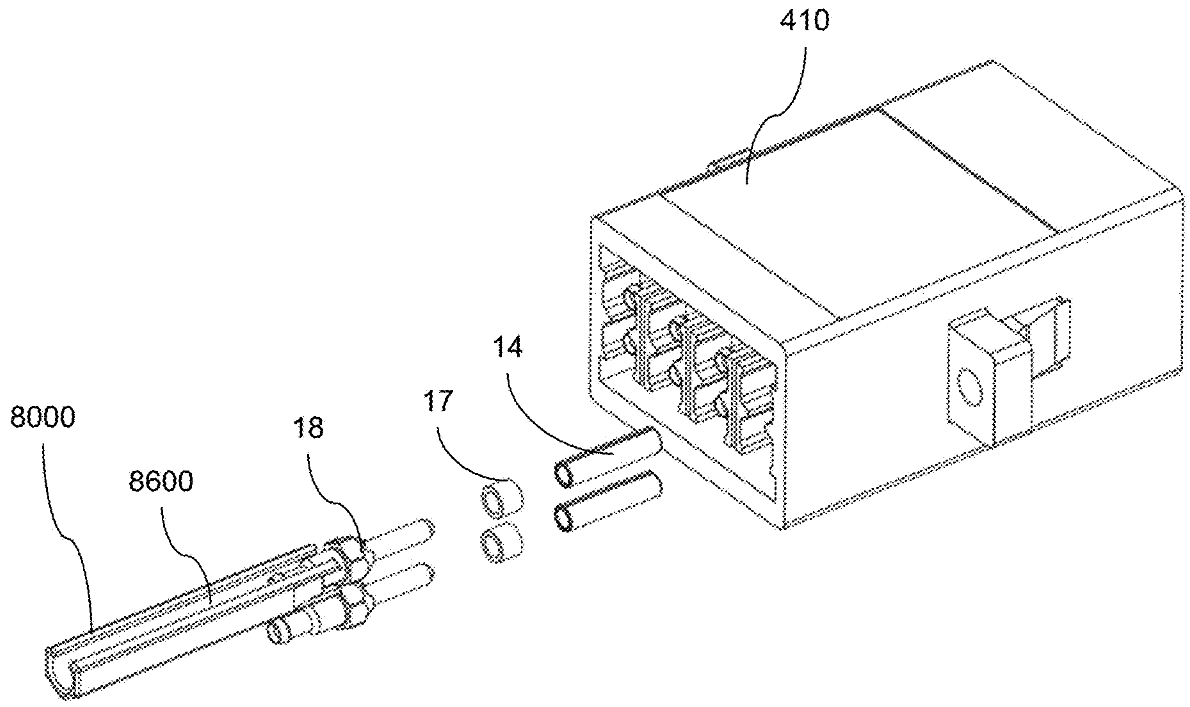
FIG. 10 illustrates using an installation tool to insert the ferrules into the fiber optic adapter of FIG. 8.

A tool 8000 is used to insert the ferrule 18 into the adapter housing 410, as shown in FIG. 10. The tool 8000 may have an elongated polyhedron shape with a slit 8600 extending along its length. For example, the main body of the tool 8000 is in a shape of hollow hexagonal prim receiving a portion of the ferrule 18 therein. When inserting the ferrule 18 into the adapter housing 410, the tool 8000 holds the distal end of the ferrule 18 such that the proximate end of the ferrule 18 is exposed and orientated to be inserted into the adapter housing 410.

Figure 11A:
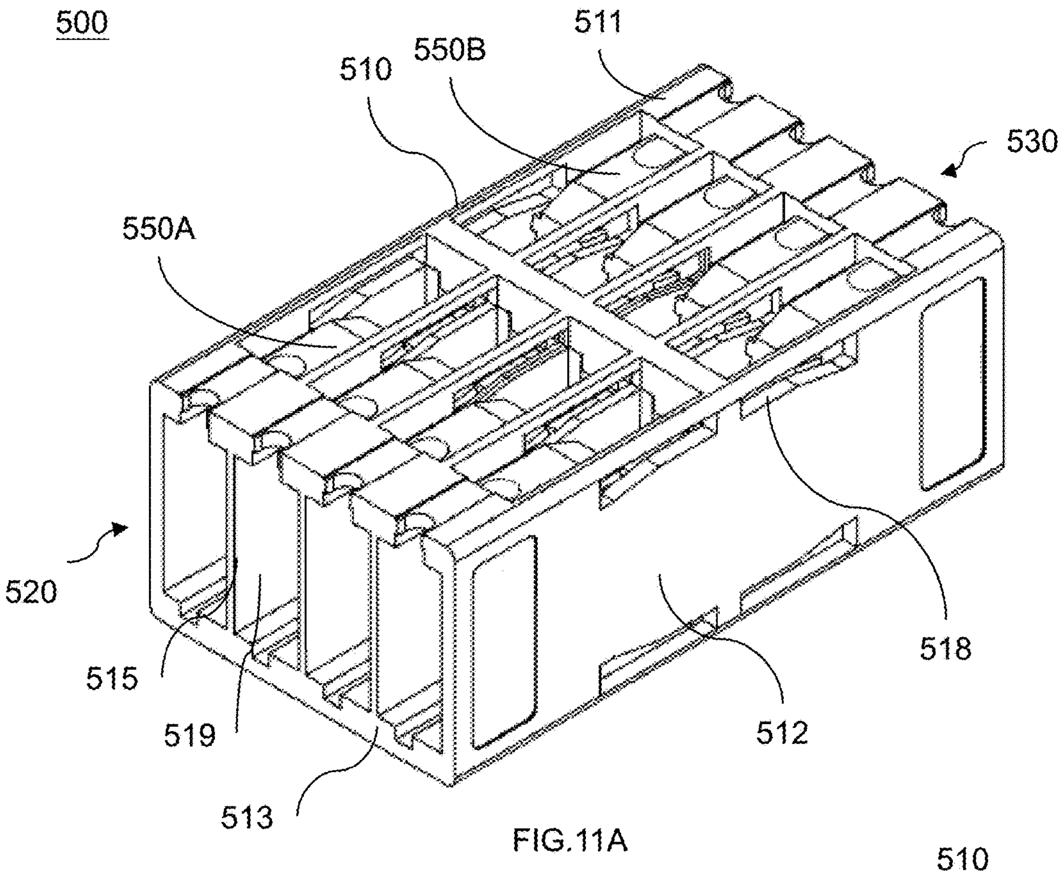
FIG. 11A is a perspective view of yet another example implementation of the fiber optic adapter in accordance with the present invention.
Figure 11B:
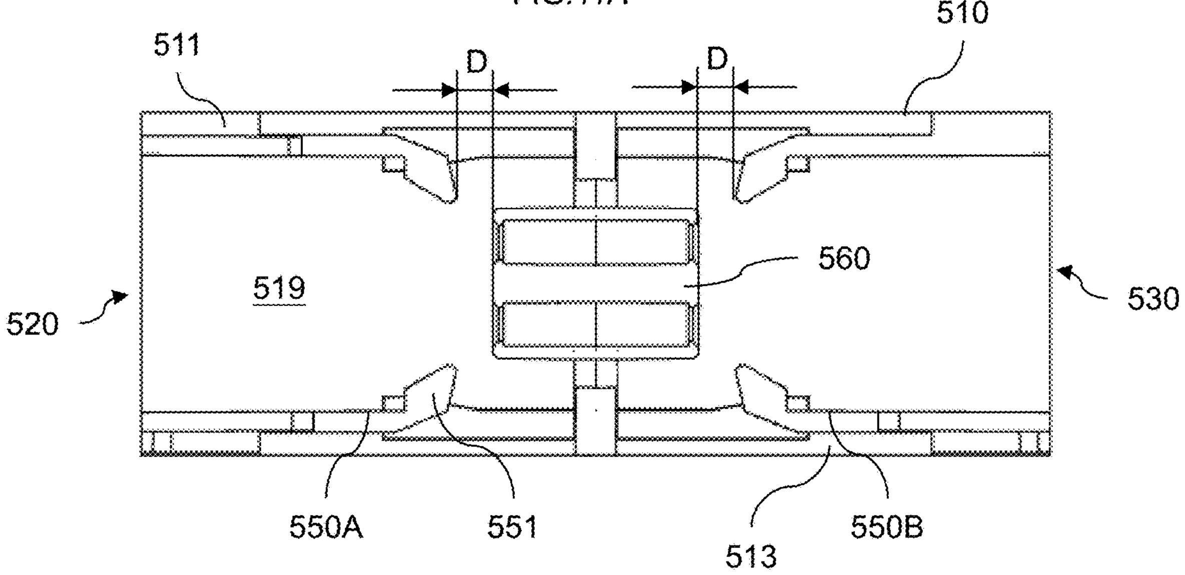
FIG. 11B is a sectional view of the fiber optic adapter of FIG. 11A, FIGS. 12A and 12B illustrate sectional views of the second fiber optic connector.

To receive the same type of the fiber optic connectors, for example, the fiber optic connector 20, the fiber optic adapter 500 is provided with one elongated arm adjacent to each of the first and second ends of the adapter housing in each channel. Turning to FIGS. 11A-11B, the fiber optic adapter 500 includes an adapter housing 510, alignment portions 560, and elongated arms 550A and 550B. The adapter housing 510 includes a top wall 511, bottom wall 513 and side walls 512 between them. multiple partition walls 515 extending in the length direction to divide a space defined by the adapter housing 510 into multiple channels 519. The adapter housing 510 has cutouts 518 on its side walls 512 to provide extra space for the movement of the elongated arms 550A and 550B. The adapter housing 510, alignment portions 560 and the elongated arms 550A and 550B are injection-molded as a unitary piece. A cover plate (as shown in FIG. 8) is attached to the top and bottom walls of the adapter housing 510, respectively.

The first elongated arm 550A is provided adjacent to the first end 520 and extends toward a second end 530, while the second elongated arm 550B is provided adjacent to the second end 530 and extends toward the first end 520. The first elongated arm 550A and the second elongated arm 550B are formed integrally with the top wall 511 or bottom wall 513. Each of the elongated arms 550A and 550B has a connector hook 551 at its distal end to secure the fiber optic connector inserted.

As shown in FIG. 11B, each elongated arm 550A or 550B is spaced from the alignment portion 560 a distance D in the length direction to avoid interference between the elongated arm and the alignment portion in molding.

In comparison with the molding method of the adapter shown in FIG. 1E, the molding method for the fiber optic adapter 500 has been changed due to the change of the molding directions. The molding directions have been changed to front/back and top/bottom directions from front/back and left/right directions, along with the change of the orientations of the elongated arms. If the elongated arms are arranged as FIG. 1D, it will cause undercuts in the mold. Therefore, more space is required on the top wall and bottom wall of the adapter housing to ensure the tools access the space S between the two connector hooks, i.e., to form the alignment portion. The cover plate then can be attached to the adapter housing after the alignment portions are formed.

Although in the previous description of the fiber optic adapter, terms such as "top", "bottom", "upper", "lower", "front", "back", "right", and "left" were used for ease of description and illustration, no restriction is intended by such use of the terms. The fiber optic adapter can be used in any orientation.

Those skilled in the art may understand that the adapter according to the present disclosure may include one or more channels. For example, the adapter may include two channels or four channels. Further, the adapter according to the present disclosure may be used with different types of connectors. For example, the adapter is compatible with connector including LC or MT ferrules.

The illustrative embodiments described in the detailed description, drawings, and claims are not meant to be limiting. It will be apparent to those skilled in the art that various modifications and variations can be made to the present invention without departing from the spirit or scope of the invention. It will be readily understood that the aspects of the present invention, as generally described herein, and illustrated in the Figures, can be arranged, substituted, combined, separated, and designed in a wide variety of different configurations, all of which are explicitly contemplated herein.

The invention claimed is:

1. A fiber optic adapter mating multiple fiber optic connectors comprising:

an adapter housing defining an outer appearance of the fiber optic adapter and having a top wall, bottom wall and side walls therebetween, having a first end and an opposite second end along a length direction, a space formed within the adapter housing between the first end and the second end, and multiple channels extending between the first end and the second end to mate two fiber optic connectors in each channel, wherein each channel is provided with a first elongated arms adjacent to the first end and extending toward the second end, and the first elongated arm is configured to be formed integrally with the top or bottom wall of the adapter housing.

2. The fiber optic adapter of claim 1, further comprising a second elongated arm adjacent to the second end and extending toward the first end, wherein the second elongated arm is configured to be formed integrally with the top or bottom wall of the adapter housing.

3. The fiber optic adapter of claim 2, wherein the first elongated arm and second elongated arm are separated and extend towards each other.

4. The fiber optic adapter of claim 2, wherein each elongated arm has a hook at its distal end to be received in a recess of the fiber optic connector.

5. The fiber optic adapter of claim 1, wherein each channel includes an alignment portion to align the fiber optic connectors inserted from the first end and second end of the adapter housing.

6. The fiber optic adapter of claim 5, wherein the alignment portion is formed integrally with the adapter housing.

7. The fiber optic adapter of claim 6, wherein each elongated arm is spaced a distance from the alignment portion in the length direction.

8. The fiber optic adapter of claim 7, wherein each of the first and second elongated arms is made of flexible material.

9. The fiber optic adapter of claim 8, wherein the first and second elongated arms are formed integrally with both the top and bottom walls of the adapter housing.

10. The fiber optic adapter of claim 1, wherein the adapter housing has at least three channels.

11. The fiber optic adapter of claim 10, wherein the multiple channels are separated by multiple partition walls.

12. A method of making the fiber optic adapter of claim 1, comprising:

forming the adapter housing and the elongated arms by injection molding; and attaching two cover plates to the top wall and bottom wall of the adapter housing.

* * * * *